United States Patent
Yang et al.

(10) Patent No.: US 11,334,774 B2
(45) Date of Patent: May 17, 2022

(54) IMAGE LABELING APPARATUS, METHOD, AND NON-TRANSITORY COMPUTER READABLE STORAGE MEDIUM THEREOF

(71) Applicant: Institute For Information Industry, Taipei (TW)

(72) Inventors: Ching-Han Yang, Taipei (TW); Deron Liang, Taipei (TW); Chin-Chun Chang, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 30 days.

(21) Appl. No.: 17/078,089

(22) Filed: Oct. 22, 2020

(65) Prior Publication Data
US 2022/0092338 A1 Mar. 24, 2022

(30) Foreign Application Priority Data

Sep. 21, 2020 (TW) .................................. 109132599

(51) Int. Cl.
*G06K 9/62* (2022.01)
(52) U.S. Cl.
CPC .......... *G06K 9/628* (2013.01); *G06K 9/6202* (2013.01); *G06K 9/627* (2013.01); *G06K 9/6215* (2013.01); *G06K 9/6228* (2013.01)
(58) Field of Classification Search
CPC .... G06K 9/628; G06K 9/6202; G06K 9/6215; G06K 9/6228; G06K 9/627
See application file for complete search history.

(56) References Cited

U.S. PATENT DOCUMENTS

| 6,347,313 | B1* | 2/2002 | Ma | G06K 9/6253 |
| | | | | 707/711 |
| 8,429,173 | B1* | 4/2013 | Rosenberg | G06F 16/14 |
| | | | | 707/748 |
| 9,443,314 | B1* | 9/2016 | Huang | G06K 9/00684 |
| 10,025,950 | B1* | 7/2018 | Avasarala | G06K 9/6223 |
| 2002/0159642 | A1* | 10/2002 | Whitney | G06K 9/6228 |
| | | | | 382/225 |
| 2008/0260249 | A1* | 10/2008 | Teoh | G06T 7/11 |
| | | | | 382/180 |
| 2009/0097756 | A1* | 4/2009 | Kato | G06F 16/5838 |
| | | | | 382/190 |

(Continued)

*Primary Examiner* — Aaron W Carter
(74) *Attorney, Agent, or Firm* — Maschoff Brennan

(57) ABSTRACT

An image labeling apparatus, method, and computer program product are provided. The image labeling apparatus generates several image features of several to-be-processed images and classifies them into several groups. For each group, the image labeling apparatus: (a) selects the image feature closest to the center as a representative feature and a compared feature, (b) selects the image feature farthest to the compared feature as a candidate feature, and (c) compares the similarity between the candidate feature and each representative feature with a threshold. When all the similarities are smaller than the threshold, adopts the candidate feature as another representative feature and the compared feature and repeats (b) and (c). The group(s) whose number of representative features is more than another threshold will be re-classified. The image labeling apparatus determines several to-be-labeled groups according to the classification result and labels the to-be-processed images within the same to-be-labeled group the same.

20 Claims, 9 Drawing Sheets

(56) References Cited

U.S. PATENT DOCUMENTS

| | | | |
|---|---|---|---|
| 2016/0277732 A1* | 9/2016 | Kim | H04N 19/521 |
| 2021/0004589 A1* | 1/2021 | Turkelson | G06K 9/6273 |
| 2021/0124997 A1* | 4/2021 | Kondou | G06K 9/6228 |

* cited by examiner

| Group No. | Number of representative features |
|---|---|
| G1 | 2 |
| G3 | 1 |
| G4 | 2 |
| G6 | 1 |
| G7 | 3 |
| G10 | 1 |
| G11 | 1 |

FIG. 1F

IMAGE LABELING APPARATUS, METHOD, AND NON-TRANSITORY COMPUTER READABLE STORAGE MEDIUM THEREOF

PRIORITY

This application claims priority to Taiwan Patent Application No. 109132599 filed on Sep. 21, 2020, which is hereby incorporated by reference in its entirety.

FIELD

The present invention relates to an image labeling apparatus, method, and non-transitory computer readable storage medium thereof. Specifically, the present invention relates to a semi-automatic image labeling apparatus, method, and non-transitory computer readable storage medium thereof using clustering technology.

BACKGROUND

Deep learning is a branch of machine learning, which has been widely used in various fields to perform various tasks (e.g., classification and identification) in recent years. Deep learning models adopted in most applications have to undergo supervised learning in advance (that is, they have to be trained with labeled data in advance), and whether a deep learning model can accomplish tasks effectively (e.g., providing high-accuracy classification and providing high-accuracy identification) depends on whether huge amount of labeled data has been provided to let the deep learning model learn the key for distinguishment in the learning stage/training stage. Therefore, providing huge amount of labeled data is an inevitable technical problem in the technical field of deep learning.

Practically, it is difficult to obtain data in some fields (e.g., images of production in manufacturing industry), let alone obtain labeled data in these fields. Although data in some fields can be obtained easily, the cost of manually labeling these data one by one is often unaffordable. Taking textile industry as an example, if a deep learning model that can distinguish various defective and non-defective cloth segments is desired, it is relied on having experts to label the defective images obtained by automatic optical inspection machine(s) and then training the deep learning model by these labeled images. Nevertheless, defective images generated by automatic optical inspection machine(s) in the textile industry are of huge amount and categories of defects (such as broken ends, stop marks, weft crackiness) and fake-defects (such as dirt, creases, cotton coverage) are numerous, which make the task of having experts to examine these defective images one by one and then label them become time-consuming. Furthermore, the textile products are developing towards the trend of little batch and diverse species, which makes images of cloth segments become more diverse. As a result, it is difficult to prepare a fully automatic labeling system that can cope with all kinds of products.

Accordingly, reducing the cost of labeling data by users (such as experts) is an urgent and unavoidable task for technologies related to deep learning.

SUMMARY

An objective of herein is to provide an image labeling apparatus. The image labeling apparatus in certain embodiments may comprise a transceiving interface, a storage, and a processor, wherein the processor is electrically connected to the transceiving interface and the storage. The storage stores a plurality of to-be-processed images. The processor generates an image feature for each of the to-be-processed images and classifies the image features into a plurality of groups. The processor performs the following operations on each of the groups to generate at least one representative feature of each of the groups: (a) selecting the image feature that is closest to a center of the group from the image features of the group as one of the at least one representative feature of the group and as a compared feature, (b) selecting the image feature that is farthest to the compared feature from the image features of the group that have not been selected as a candidate feature, wherein a similarity degree is between the candidate feature and each of the at least one representative feature, and (c) comparing at least one of the at least one similarity degree with a first threshold. When the at least one similarity degree is all smaller than the first threshold, the processor assigns the candidate feature as one of the at least one representative feature of the group and as the compared feature of the next iteration and performs the operation (b) and the operation (c) again.

The groups are classified into a first portion and a second portion by a second threshold, wherein a number of the at least one representative feature of each group of the second portion is greater than the second threshold. The processor classifies each group of the second portion into a plurality of refined groups and assigns the groups of the first portion and the refined groups of the second portion as a plurality of to-be-labeled groups. The transceiving interface receives a plurality of labeling instructions, wherein each of the labeling instructions corresponds to one of the to-be-labeled groups. The processor labels the to-be-processed images of each of the to-be-labeled groups according to the corresponding labeling instruction.

Another objective is to provide an image labeling method, which is for use in an electronic computing apparatus. The electronic computing apparatus stores a plurality of to-be-processed images, and the image labeling method of certain embodiments may comprise the following steps (a) to (g). The step (a) is to generate an image feature for each of the to-be-processed images. The step (b) is to classify the image features into a plurality of groups. The step (c) is to perform the following steps on each of the groups to generate at least one representative feature of each of the groups: (c1) selecting the image feature that is closest to a center of the group from the image features of the group as one of the at least one representative feature of the group and as a compared feature, (c2) selecting the image feature that is farthest to the compared feature from the image features of the group that have not been selected as a candidate feature, wherein a similarity degree is between the candidate feature and each representative feature of the group, and (c3) comparing at least one of the at least one similarity degree with a first threshold. When the at least one similarity degree is all smaller than the first threshold, the candidate feature is assigned as one of the at least one representative feature of the group and as the compared feature of the next iteration and the step (c2) and the step (c3) are performed again.

The groups are classified into a first portion and a second portion by a second threshold, wherein a number of the at least one representative feature of each group of the second portion is greater than the second threshold. The step (d) is to classify each group of the second portion into a plurality of refined groups. The step (e) is to assign the groups of the first portion and the refined groups of the second portion as a plurality of to-be-labeled groups. The step (f) is to receive a plurality of labeling instructions, wherein each of the labeling instructions corresponds to one of the to-be-labeled groups. The step (g) is to label the to-be-processed images of each of the to-be-labeled groups according to the corresponding labeling instruction.

Yet another objective is to provide a non-transitory computer readable storage medium, which stores a computer program comprising a plurality of codes. After an electronic computing apparatus loads the computer program, the electronic computing apparatus executes the codes of the computer program to perform the aforesaid image labeling method.

The image labeling technology (including at least the apparatus, method, and non-transitory computer readable storage medium) provided herein achieves semi-automatic labeling of a plurality of to-be-processed images by adopting clustering technology. Specifically, the image labeling technology provided by the present invention generates an image feature for each of the to-be-processed images, classifies the image features into a plurality of groups, and generates at least one representative feature for each of the groups. According to the image labeling technology provided herein, if a group has a plurality of representative features, the similarity degree between any representative feature in the group and the rest representative feature(s) in the group is smaller than a first threshold. In other words, if a group has a plurality of representative features, the representative features are diverse enough from each other.

If the number of the representative features in a group is greater than a second threshold, it means that the group is not properly classified so that the group is mixed with image features belonging to different categories or/and images having different characteristics. Therefore, if the number of the representative features in a group is greater than a second threshold, the image labeling technology provided by the present invention will further divide the group and may further determine at least one representative feature for each group after the division. The image labeling technology provided by the present invention may repeat the above operations until the number of the representative features of all groups is not greater than the second threshold (i.e., all groups have been properly classified).

The image labeling technology provided herein will consider the groups obtained by the above processing as to-be-labeled groups. Since the to-be-labeled groups have been properly classified, all the to-be-processed images in the same to-be-labeled group can be given the same label. For example, for a to-be-labeled group, the user may decide the label of all the to-be-processed images of the to-be-labeled group according to one or several to-be-processed images of the to-be-labeled group (e.g., the to-be-processed image(s) corresponding to the representative feature(s)) and input a corresponding labeling instruction. The image labeling technology provided by the present invention then labels the to-be-processed images corresponding to the to-be-labeled group according to the corresponding labeling instruction. With the above operations/steps, the image labeling technology provided by the present invention can achieve semi-automatic labeling of a plurality of to-be-processed images and thereby greatly reduce the cost of labeling data by users.

The detailed technology and exemplary embodiments implemented for the subject invention are described in the following paragraphs accompanying the appended drawings for a person having ordinary skill in the art to well appreciate the features of the claimed invention.

BRIEF DESCRIPTION OF THE DRAWINGS

FIG. 1F shows a plurality of groups and the corresponding number of representative features;

DETAILED DESCRIPTION

In the following description, the image labeling apparatus, method, and non-transitory computer readable storage medium thereof provided by certain embodiments of the present invention will be described through example embodiments thereof. However, these example embodiments are not intended to limit the present invention to any specific environment, applications, examples, embodiments, or implementations described in these example embodiments. Therefore, the description of the following example embodiments is only for the purpose of explaining the present invention and is not intended to limit the scope of the present invention.

It shall be appreciated that, in the following embodiments and attached drawings, elements unrelated to the present invention are omitted from depiction. Please note that dimensions of elements and proportional relationships among individual elements in the attached drawings are only for ease of depiction and description, but not intended to limit the scope of the present invention.

Figure 1A:
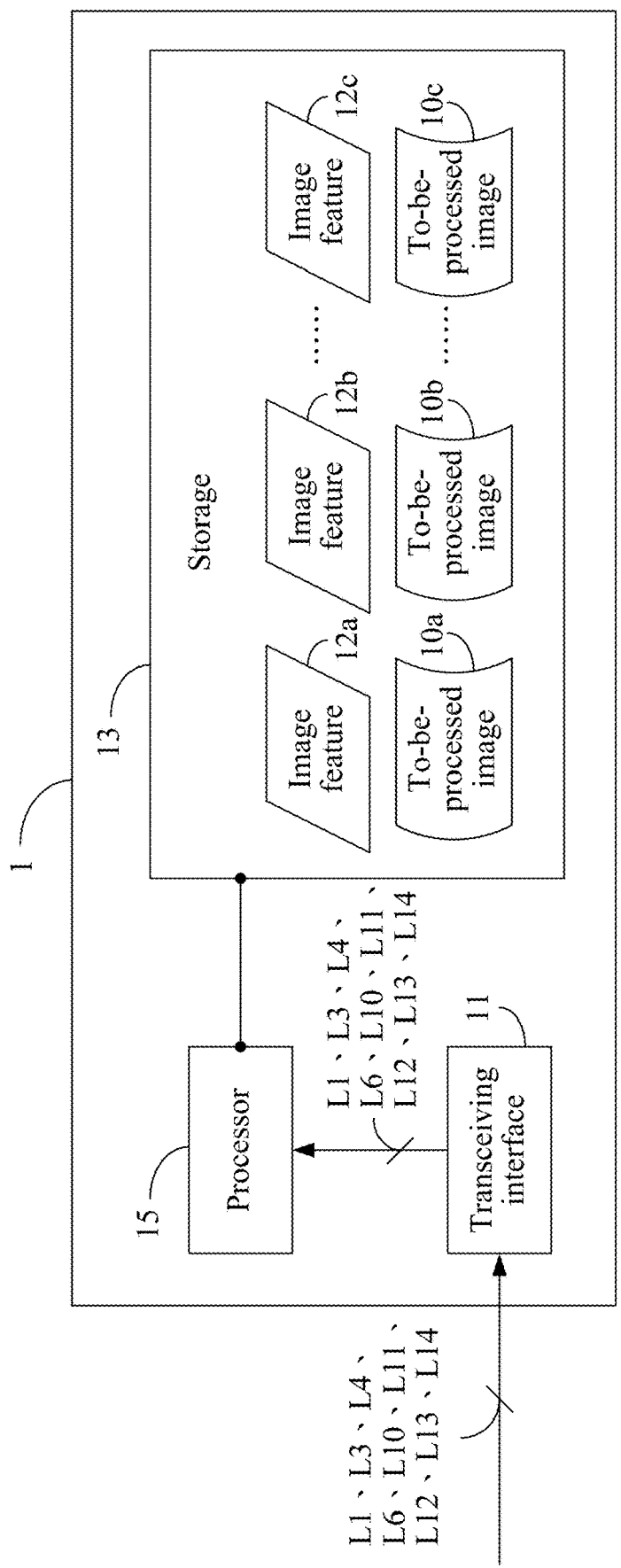
FIG. 1A depicts a schematic view of the image labeling apparatus 1.

A first embodiment of the present invention is an image labeling apparatus 1, and a schematic view thereof is depicted in FIG. 1A. The image labeling apparatus 1 comprises a transceiver interface 11, a storage 13, and a processor 15, wherein the processor 15 is electrically connected to the transceiver interface 11 and the storage 13. The transceiver interface 11 may be any interface that can be used in combination with the processor 15 and that can receive and transmit signals, such as a universal serial bus interface and a network interface card. The storage 13 may be a memory, a Hard Disk Drive (HDD), a Universal Serial Bus (USB) disk, a Compact Disk (CD), or any other non-transitory storage medium or apparatus with the same function and well-known to a person having ordinary skill in the art. The processor 15 may be one of various processors, Central Processing Units (CPUs), Microprocessor Units (MPUs), Digital Signal Processors (DSPs), or any other computing apparatus with the same function and well-known to a person having ordinary skill in the art.

Figure 1B:
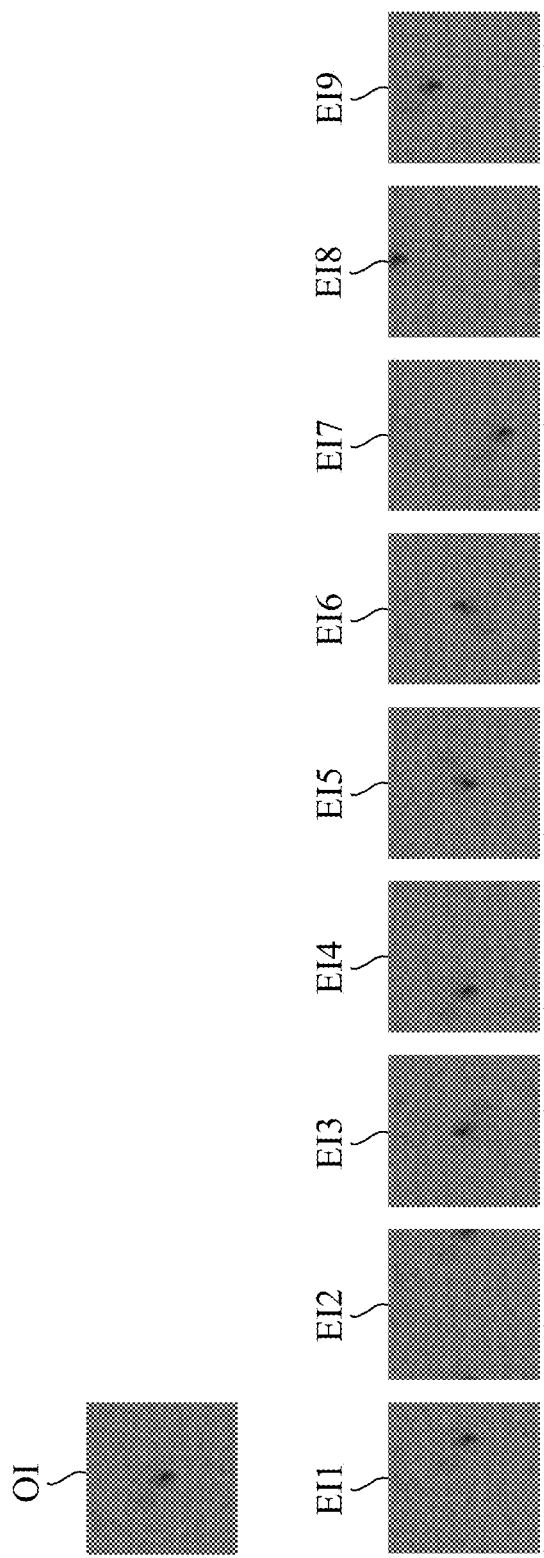
FIG. 1B depicts an exemplary original image and a plurality of corresponding augmented images.

In this embodiment, the storage 13 stores a plurality of original images (not shown) of a certain field (e.g. the textile industry), such as images taken by a photographic equipment for one or more objects in a certain field. Taking the textile industry as an example, the original images may be a plurality of defective images of cloth segments taken by a photographic equipment equipped on one or more automatic optical inspection machines in a textile factory. The processor 15 generates at least one augmented image for each of a plurality of original images by applying at least one basic data augmentation process (e.g., image translation, image flipping, and image rotation) to each of the original images. Please refer to a specific example shown in FIG. 1B, which depicts an original image OI and the augmented images EI1, EI2, EI3, EI4, EI5, EI6, EI7, EI8, and EI9 obtained after applying various basic data augmentation processes on the original image OI. The processor 15 then takes the original images and the augmented images as a plurality of to-be-processed images 10a, 10b, ..., 10c and stores them in the storage 13.

Please note that the processor 15 increases the number of the to-be-processed images by applying at least one basic data augmentation process to each original image so that some feature will appear in multiple to-be-processed images, which can increase the accuracy of subsequent classification. Please also note that the number of times that the processor 15 applies basic data augmentation process to an original image is not limited in the present invention. In other words, the number of augmented images corresponding to an original image is not limited in the present invention. Furthermore, in some embodiments, the processor 15 may skip the operations of applying basic data augmentation process(es) to original images and directly take the original images as the to-be-processed images 10a, 10b, ..., 10c to be processed subsequently (e.g., when the number of original images stored in the storage 13 is enough, when the number of original images for different features is enough).

In this embodiment, the processor 15 generates an image feature for each of the to-be-processed images 10a, 10b, ..., 10c and thereby obtain the image features 12a, 12b, ..., 12c corresponding to the to-be-processed images 10a, 10b, ..., 10c respectively. It shall be appreciated that the processor 15 may adopt various techniques that can generate image features as long as each generated image feature has feature(s) that can reflect the corresponding to-be-processed image.

Figure 1C:
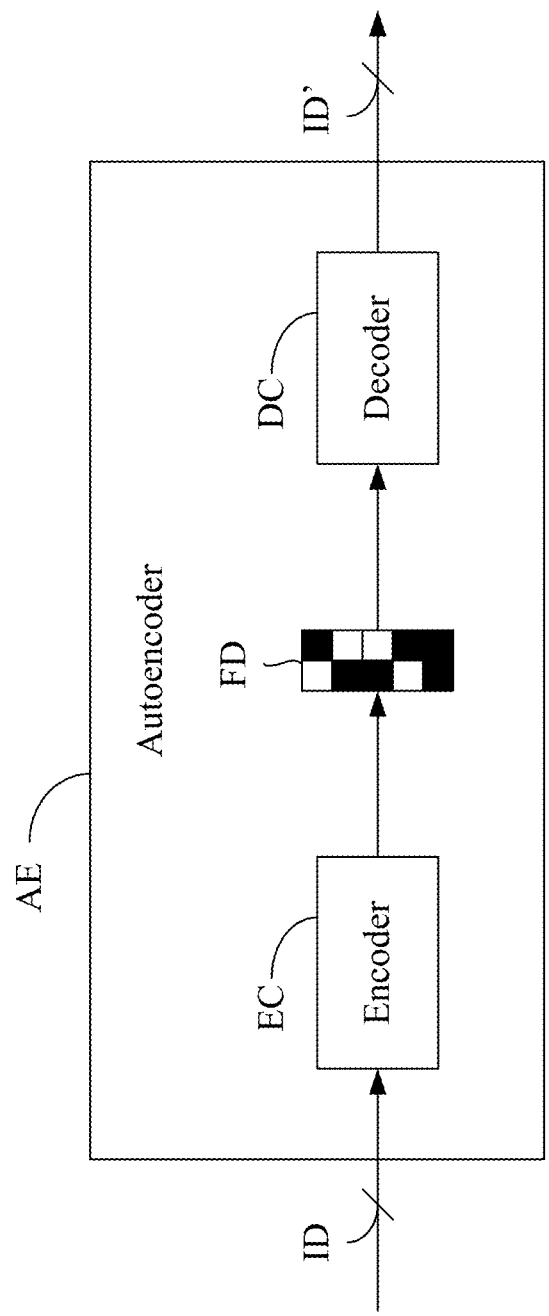
FIG. 1C depicts a schematic view of a conventional autoencoder AE.

In some embodiments, the processor 15 may use an autoencoder to generate the image features 12a, 12b, ..., 12c corresponding to the to-be-processed images 10a, 10b, ..., 10c respectively. FIG. 1C depicts the architecture of a conventional autoencoder AE. The autoencoder AE comprises an encoder EC and a decoder DC and may be realized by a multi-layer neural network. The encoder EC is responsible for compressing (which may be considered as dimensionality reduction) the input data ID of the autoencoder AE into the feature data FD (e.g., a feature vector) that can represent the input data ID, while the decoder DC is responsible for decompressing the feature data FD into the output data ID' that has the same meaning as the input data ID does. Since the input data ID of the autoencoder AE and the output data ID' have the same meaning, it means that the feature data FD has a feature that can reflect the input data ID. Based on the aforementioned characteristics of the autoencoder AE, the processor 15 may input the to-be-processed images 10a, 10b, ..., 10c into the autoencoder AE individually and take the outputs of the encoder EC comprised in the autoencoder AE as the image features 12a, 12b, ..., 12c corresponding to the to-be-processed images 10a, 10b, ..., 10c respectively.

In some embodiments, in order to make the autoencoder AE have the ability to generate the output data ID' with the same meaning as the input data ID does (i.e., to let the feature data FD generated by the encoder EC have the feature that can reflect the input data ID), the processor 15 may train the autoencoder AE by the to-be-processed images 10a, 10b, ..., 10c before utilizing the autoencoder AE to generate the image features 12a, 12b, ..., 12c corresponding to the to-be-processed images 10a, 10b, 10c respectively. A person having ordinary skill in art shall be familiar with the details regarding the training of the autoencoder AE and, thus, the details will not be further described herein. For those embodiments, only after the autoencoder AE has been trained will the processor 15 inputs the to-be-processed images 10a, 10b, ..., 10c into the autoencoder AE individually and take the output of the encoder EC comprised in the autoencoder AE as the image features 12a, 12b, ..., 12c corresponding to the to-be-processed images 10a, 10b, ..., 10c respectively.

After generating the image features 12a, 12b, ..., 12c corresponding to the to-be-processed images 10a, 10b, ..., 10c respectively, the processor 15 classifies the image features 12a, 12b, ..., 12c into a plurality of groups (not shown). In some embodiments, the processor 15 may adopt a clustering algorithm to classify the image features 12a, 12b, ..., 12c into a plurality of groups. The clustering algorithm adopted by the processor 15 may be a Partitional Clustering Algorithm, which has the characteristic of dividing a set of data objects into a plurality of non-overlapping subsets so that each data object falls into only one subset. For example, the processor 15 may classify the image features 12a, 12b, ..., 12c into a plurality of groups by using the K-means algorithm. Please note that, in this embodiment, since the processor 15 has increased the number of to-be-processed images by applying at least one basic data augmentation process to each original image so that certain features appear in multiple to-be-processed images, the image features with the same characteristics (e.g., image features of defective images belonging to "broken ends" in the textile industry) will be more likely to be classified into the same group at this stage.

In this embodiment, since the to-be-processed images 10a, 10b, ..., 10c include the original images and the augmented images, the processor 15 further removes the image features corresponding to the augmented images from each group so that each group only has the image features corresponding to the original images. The purpose of removing the image features corresponding to the augmented images in each group is to avoid the situation that some group(s) only has/have the image feature(s) corresponding to the augmented image(s) but no image feature corresponding to the original image. In other embodiments, if the processor 15 only takes the original images as the to-be-processed images, the aforesaid operation of removing the image features corresponding to the augmented images from each group may be omitted (because there is no augmented image and, thus, no corresponding image feature can be removed).

Figure 1D:
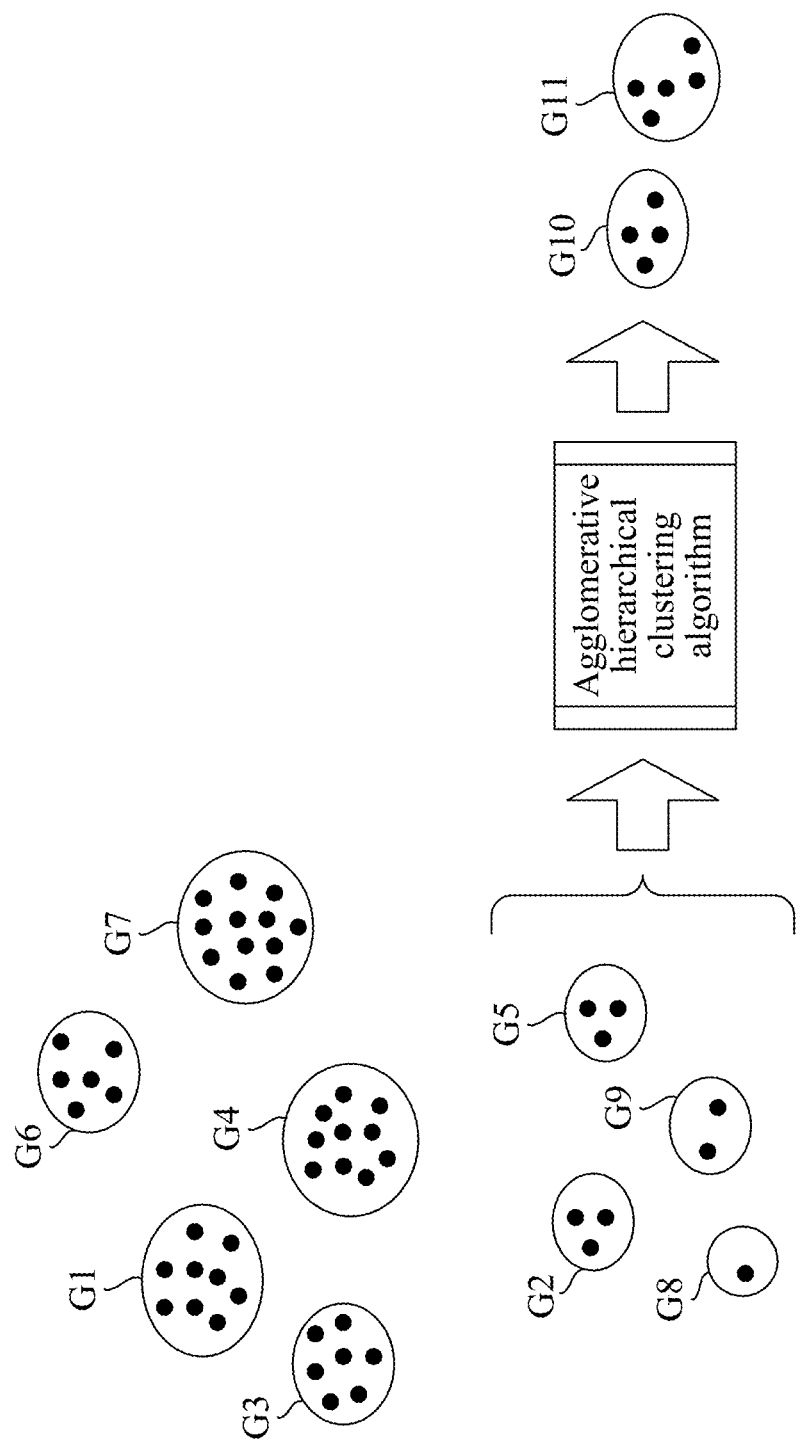
FIG. 1D depicts a schematic view of integrating some groups by an agglomerative hierarchical clustering algorithm.

In this embodiment, after the processor 15 classifies the image features 12a, 12b, ..., 12c into a plurality of groups and removes the image features corresponding to the augmented images from each group, the processor 15 further aggregates and re-classifies the groups whose image features are not enough by an agglomerative hierarchical clustering algorithm. Specifically, the processor 15 may calculate the number of image features comprised in each group (not shown), find out the group(s) whose number of image features is smaller than a threshold from these groups (i.e., determine a subset from these groups, and the number of image features of each group comprised in the subset is smaller than the threshold), and then integrate the groups comprised in the subset by the agglomerative hierarchical clustering algorithm. Please refer to a specific example shown in FIG. 1D for comprehension, which, however, is not intended to limit the scope of the present invention. In FIG. 1D, each black dot represents an image feature. In this specific example, the processor 15 classifies the image features 12a, 12b, ..., 12c into nine groups G1, G2, G3, G4, G5, G6, G7, G8, and G9 by a clustering algorithm and finds out that the number of image features of each of the groups G2, G5, G8, and G9 among all the groups is smaller than a threshold (e.g., 4). Therefore, the processor 15 integrates the groups G2, G5, G8 and G9 into the groups G10 and G11 by the agglomerative hierarchical clustering algorithm.

A person having ordinary skill in the art shall be familiar with the details of the agglomerative hierarchical clustering algorithm and, thus, the details will not be further described herein. Please note that the purpose of using the agglomerative hierarchical clustering algorithm to aggregate and re-classify the groups whose image features are not enough is to reduce the number of poor-effective groups (i.e., the groups with too few image features) and thereby reduce the number of images that a user has to watch for category determination subsequently (will be explained later). In some embodiments, if there is no need in reducing the number of images for a user to watch for category determination, the processor 15 may omit the operation of using the agglomerative hierarchical clustering algorithm to aggregate and re-classify the groups whose number of image features are too few.

Afterwards, the processor 15 performs the operations of the next stage, i.e., determining at least one representative feature of each of the groups. In this embodiment, since the processor 15 has adopted the agglomerative hierarchical clustering algorithm to aggregate and re-classify the groups whose image features are not enough, the groups to be processed in the next stage are the refined groups. Please refer to the specific example in FIG. 1D. If the processor 15 has adopted the agglomerative hierarchical clustering algorithm to aggregate and re-classify the groups whose image features are not enough, the groups to be processed in the next stage are the groups G1, G3, G4, G6, G7, G10, and G11. In other embodiments, if the processor 15 does not adopt the agglomerative hierarchical clustering algorithm to aggregate and re-classify the groups whose image features are not enough, the groups to be processed in the next stage are the groups generated after the above classification. Please refer to the specific example in FIG. 1D again. If the processor 15 does not adopted the agglomerative hierarchical clustering algorithm to aggregate and re-classify the groups whose image features are not enough, the groups to be processed in the next stage are the groups G1, G2, G3, G4, G5, G6, G7, G8, and G9.

How the processor 15 determines at least one representative feature of each group will now be described in detail. Specifically, for each group, the processor 15 performs the following operations: (a) selecting the image feature that is closest to a center of the group from the image features of the group as one of the at least one representative feature of the group and as a compared feature, (b) selecting the image feature that is farthest to the compared feature from the image features of the group that have not been selected as a candidate feature, wherein a similarity degree is between the candidate feature and each representative feature of the group, and (c) comparing at least one of the at least one similarity degree with a threshold. If the at least one similarity degree is all smaller than the threshold, the processor 15 assigns the candidate feature as one of the at least one representative feature of the group and as the compared feature of the next iteration, and executes the operation (b) and the operation (c) again.

When performing the above operation (a), the processor 15 may calculate the Euclidean distance between each image feature and the center of the group to evaluate which image feature is closest to the center of the group. In addition, when performing the above operation (b), the processor 15 may calculate the Euclidean distance between each unselected image feature and the compared feature to evaluate which image feature is farthest to the compared feature. It shall be appreciated that the aforementioned Euclidean distance is only an example and is not intended to limit the scope of the present invention. In addition, when calculating the similarity degree between a candidate feature and each of the at least one representative feature, the processor 15 may adopt the cosine similarity between the candidate feature and each of the at least one representative feature. Similarly, the aforementioned cosine similarity is only an example and is not intended to limit the scope of the present invention.

Figure 1E:
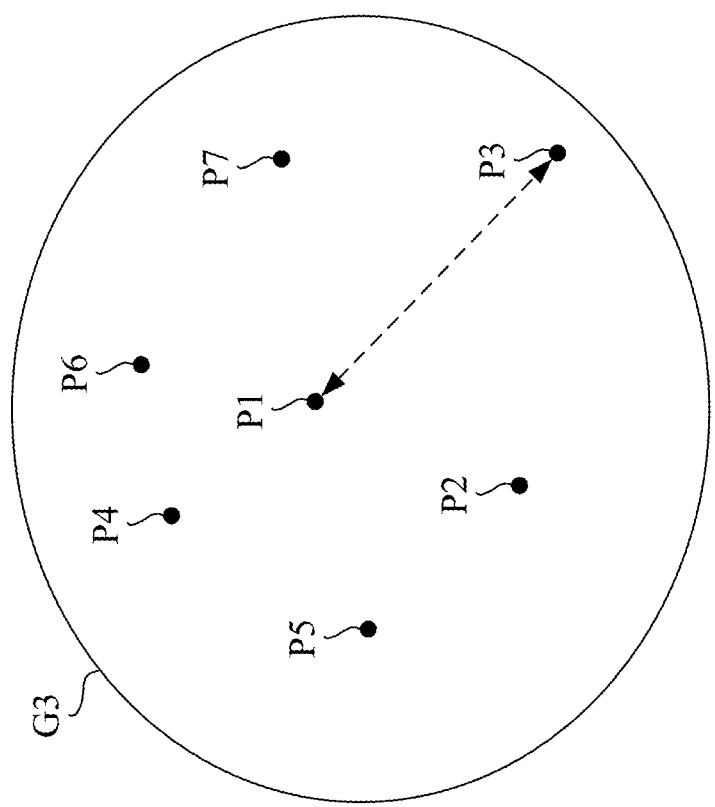
FIG. 1E depicts a schematic view of how to determine at least one representative feature of the group G3.

Please refer to a specific example shown in FIG. 1E for comprehension, which, however, is not intended to limit the scope of the present invention. The specific example is used to explain how to determine at least one representative feature of the group G3. Each black dot in FIG. 1E represents an image feature.

The processor 15 performs the operation (a). Specifically, the processor 15 calculates the center of the group G3 according to the image features P1, P2, P3, P4, P5, P6, and P7 comprised in the group G3, calculates the distances (e.g., Euclidean distances) between the center of the group G3 and each of the image features P1, P2, P3, P4, P5, P6, and P7, and then selects the image feature (e.g., the image feature P1) closest to the center of the group G3 according to these distances as one representative feature of the group G3 as well as the compared feature of performing the operation (b) in this iteration.

Then, the processor 15 performs the operation (b). Specifically, the processor 15 calculates the distance (e.g., Euclidean distance) between each image feature in the group G3 that is not selected as a representative feature and the compared feature and then selects the image feature that is farthest to the compared feature as a candidate feature according to these distances. For example, the compared feature is the image feature P1 when the operation (b) is performed for the first iteration, the processor 15 calculates the distances between each of the image features P2, P3, P4, P5, P6, and P7 and the image feature P1 and then selects the image feature P3 as a candidate feature according to these distances.

Subsequently, the processor 15 performs the operation (c). Please note that there is a similarity degree (e.g., cosine similarity) between the candidate feature selected in the operation (b) and each representative feature of the group G3 (if it is the first iteration, there is only one representative feature), and the processor 15 performs the operation (c) based on the similarity degree(s) between the candidate feature and one or more representative features. Specifically, the processor 15 selects one representative feature from the representative features of the group G3, calculates a similarity degree between the candidate feature and the representative feature selected at this time, and compares the similarity degree with a threshold. If the similarity degree reaches the threshold (i.e., the similarity degree is equal to or greater than the threshold), the selection of the representative features of the group G3 will be ended. If the similarity degree is less than the threshold, the processor 15 will repeat the above operations (i.e., selecting another representative feature (if any) of the group G3, calculating a similarity degree between the candidate features and the representative feature selected at this time, and compare the similarity degree with the threshold). If the processor 15 does not find a representative feature whose corresponding similarity degree reaches the threshold after performing the above operations for all representative features (i.e., the similarity degree between the candidate feature and each of the representative features of the group G3 is less than the threshold), the processor 15 assigns the candidate feature as another representative feature of the group G3 and the compared feature of the next iteration and performs the operations (b) and (c) again.

For example, the candidate feature is the image feature P3 and the group G3 has only one representative feature (i.e., the image feature P1) when the operation (c) is performed in the first iteration, and the processor 15 calculates the similarity degree between the image feature P3 and the image feature P1. If the similarity degree between the image feature P3 and the image feature P1 is greater than or equal to the threshold, the selection of representative features of the group G3 is ended. If the similarity degree between the image feature P3 and the image feature P1 is smaller than the threshold, the processor 15 assigns the image feature P3 as another representative feature of the group G3 and the compared feature of the next iteration and performs the operations (b) and (c) again.

Please note that the purpose of the above operation (a) is to find out the image feature that is most representative in a group (i.e., the image feature closest to the center of the group) as the representative feature. The purpose of the above operations (b) and (c) is to find out the image feature that is farthest to the latest representative feature as the candidate feature and then evaluate whether to take the candidate feature as another representative feature of the group. Among the image features that are not selected as the representative features, the candidate feature is farthest to the latest representative feature. It means that among the image features that are not selected as representative features, the candidate feature is most likely to be not similar to the representative features. Therefore, if the similarity degree between the candidate feature and some representative feature reaches the threshold, it means that the image feature that is most likely to be not similar enough is already similar enough. Thus, there is no need to select other representative feature for the group. If the similarity degree(s) between the candidate feature and all representative feature(s) is/are smaller than the threshold, the candidate feature may be used as another representative feature of the group because there are enough differences between the candidate feature and all the representative features.

The processor 15 determines at least one representative feature of each of the groups by executing the above operations (a), (b), and (c). For convenience, it is assumed that the processor 15 determines the representative feature(s) for each of the groups G1, G3, G4, G6, G7, G10, G11, and the number of representative features of each of the groups G1, G3, G4, G6, G7, G10, G11 is shown in FIG. 1F.

In this embodiment, the processor 15 classifies all the groups (i.e., groups G1, G3, G4, G6, G7, G10, G11) at this stage into a first portion and a second portion by another threshold (e.g., two). The number of representative features of each group corresponding to the first portion is not greater than the threshold, so the groups G1, G3, G4, G6, G10 and G11 are included. The number of representative features of each group corresponding to the second portion is greater than the threshold, so the group G7 is included.

Figure 1G:
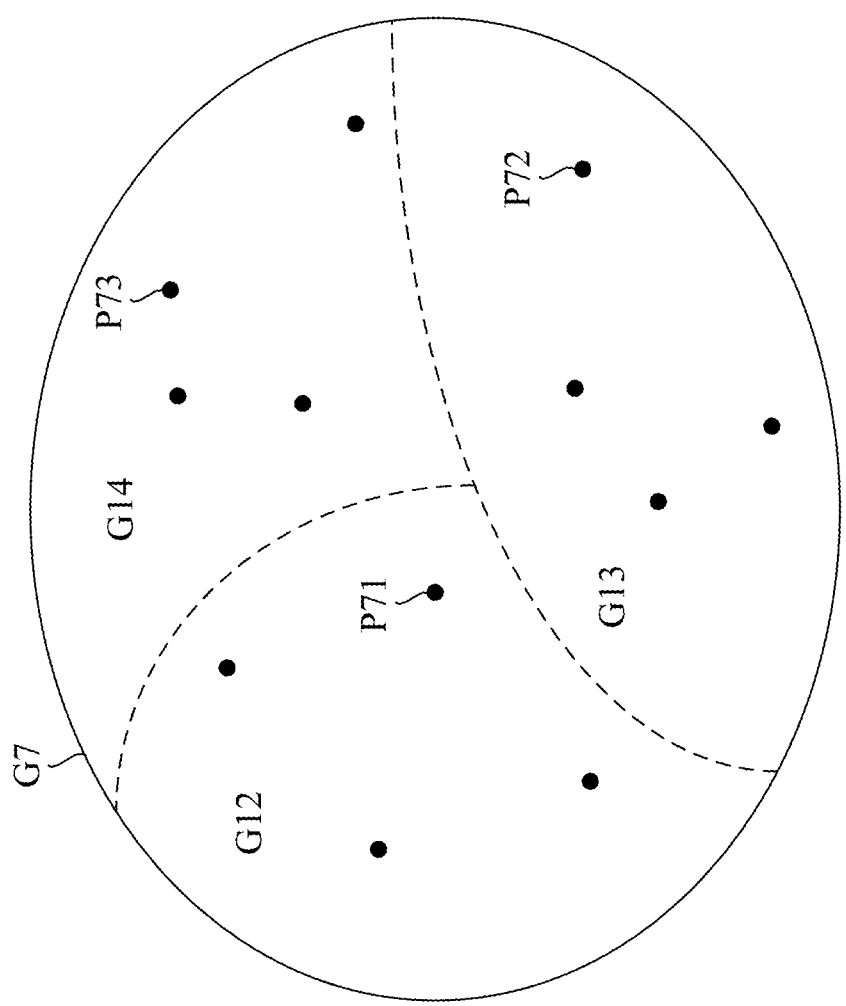
FIG. 1G depicts a schematic view of performing refined classification on the group G7.

Please note that if the number of representative features in a group is greater than the threshold, it means that the image features corresponding to that group are mixed with image features that belong to different categories or/and have different characteristics. Therefore, the processor 15 classifies each group corresponding to the second portion (that is, each group with mixed image features) into a plurality of refined groups. In some embodiments, the processor 15 may adopt the aforementioned clustering algorithm (e.g., the aforementioned K-means algorithm) to classify each group corresponding to the second portion into a plurality of refined groups. When performing refined classification for a group, the processor 15 may adopt all the representative features of the group as the initial center points of the clustering algorithm. Please refer to a specific example shown in FIG. 1G, which, however, is not intended to limit the scope of the present invention. In this specific example, the group G7 has representative features P71, P72, and P73, so the processor 15 takes the representative features P71, P72, and P73 as the initial center points of the clustering algorithm and then classifies the group G7 into three refined groups G12, G13, and G14 by the clustering algorithm.

Then, the processor 15 determines a plurality of to-be-labeled groups according to the groups G1, G3, G4, G6, G10, G11 comprised in the first portion and the refined groups G12, G13, G14. In this embodiment, the processor 15 takes the groups G1, G3, G4, G6, G10, G11 and the refined groups G12, G13, G14 as the to-be-labeled groups.

In some embodiments, the processor 15 may also perform the above operations (a), (b), and (c) for each of the refined groups G12, G13, and G14 to generate at least one representative feature of each of the refined groups G12, G13, and G14. Then, the processor 15 may further determine whether the number of representative features in each of the refined groups G12, G13, and G14 is greater than the aforesaid threshold (i.e., the aforesaid threshold used to evaluate whether a group is mixed with image features that belong to different categories or/and have different characteristics). For each refined group whose number of representative features is greater than the threshold (if any), the processor 15 may perform refined classification again by using the same approach. According to the above descriptions, a person having ordinary skill in the art shall appreciate that the processor 15 may repeatedly perform the above operations until finding out the groups that can properly classify all the image features 12a, 12b, . . . , 12c (i.e., the number of representative features of all the groups is not greater than the threshold). Thus, the details will not be further described herein. For those embodiments, the processor 15 will take the finally obtained groups (i.e., groups that can properly classify all the image features 12a, 12b, . . . , 12c) as a plurality of to-be-labeled groups.

As described above, in this embodiment, the processor 15 takes the groups G1, G3, G4, G6, G10, and G11 and the refined groups G12, G13, and G14 as the to-be-labeled groups. Then, the processor 15 determines at least one representative image of each of the to-be-labeled groups. For example, for a to-be-labeled group, the processor 15 may select a to-be-processed image corresponding to any image feature of the to-be-labeled group as a representative image. For another example, for a to-be-labeled group, the processor 15 may select the at least one to-be-processed image corresponding to the at least one representative feature of the to-be-labeled group as at least one representative image. For another example, for a to-be-labeled group, the processor 15 may input each of the at least one representative feature of the to-be-labeled group into the decoder DC of the autoencoder AE to obtain at least one output data and then use the at least one output data as at least one representative image.

The image labeling apparatus 1 will let the user know the at least one representative image of each of the to-be-labeled groups. For example, the image labeling apparatus 1 may transmit the at least one representative image of each of the to-be-labeled groups to a terminal apparatus of the user through the transceiver interface 15. For another example, the image labeling apparatus 1 may comprise a display screen so that the at least one representative image of each of the to-be-labeled groups can be displayed thereon. Since the user knows the representative image(s) corresponding to each of the to-be-labeled groups, the user can determine one or more labels corresponding to each of the to-be-labeled groups according to the representative image(s) corresponding to each of the to-be-labeled groups. The user may input labeling instructions L1, L3, L4, L6, L10, L11, L12, L13, and L14 respectively corresponding to the to-be-labeled groups (i.e., the groups G1, G3, G4, G6, G10, and G11 and the refined groups G12, G13, and G14) through an input interface, wherein the labeling instructions L1, L3, L4, L6, L10, L11, L12, L13, and L14 individually record one or more labels of the corresponding to-be-labeled groups.

The image labeling apparatus 1 receives the labeling instructions L1, L3, L4, L6, L10, L11, L12, L13, and L14 via the transceiver interface 11. As mentioned above, the labeling instructions L1, L3, L4, L6, L10, L11, L12, L13, and L14 individually correspond to one of the to-be-labeled groups (i.e., the groups G1, G3, G4, G6, G10, and G11 and the refined groups G12, G13, and G14). Then, the processor 15 labels the to-be-processed images corresponding to the to-be-labeled groups according to one or more labels recorded in the labeling instructions L1, L3, L4, L6, L10, L11, L12, L13, and L14. For example, if the labeling instruction L1 corresponds to the group G1 and records a label "weft crackiness," the processor 15 labels all the to-be-processed images comprised in the group G1 as "weft crackiness."

According to the above descriptions, the image labeling apparatus 1 classifies the image features $12a$, $12b$, ..., $12c$ of the to-be-processed images $10a$, $10b$, ..., $10c$ into a plurality of groups, selects at least one representative feature for each of the groups, and then determines whether the image features $12a$, $12b$, ..., $12c$ are properly classified according to the number of representative features of each of the groups. For groups that are not properly classified, the image labeling apparatus 1 performs refined classification on each of the groups. With the above operations, the image features $12a$, $12b$, ..., $12c$ are properly classified by the to-be-labeled groups finally determined by the image labeling apparatus 1 and, thus, all the to-be-processed images in the same to-be-labeled group may be given the same label. Therefore, the image labeling apparatus 1 can achieve semi-automatic labeling of a plurality of to-be-processed images and thereby greatly reduce the cost of labelling data by users.

Figure 2:
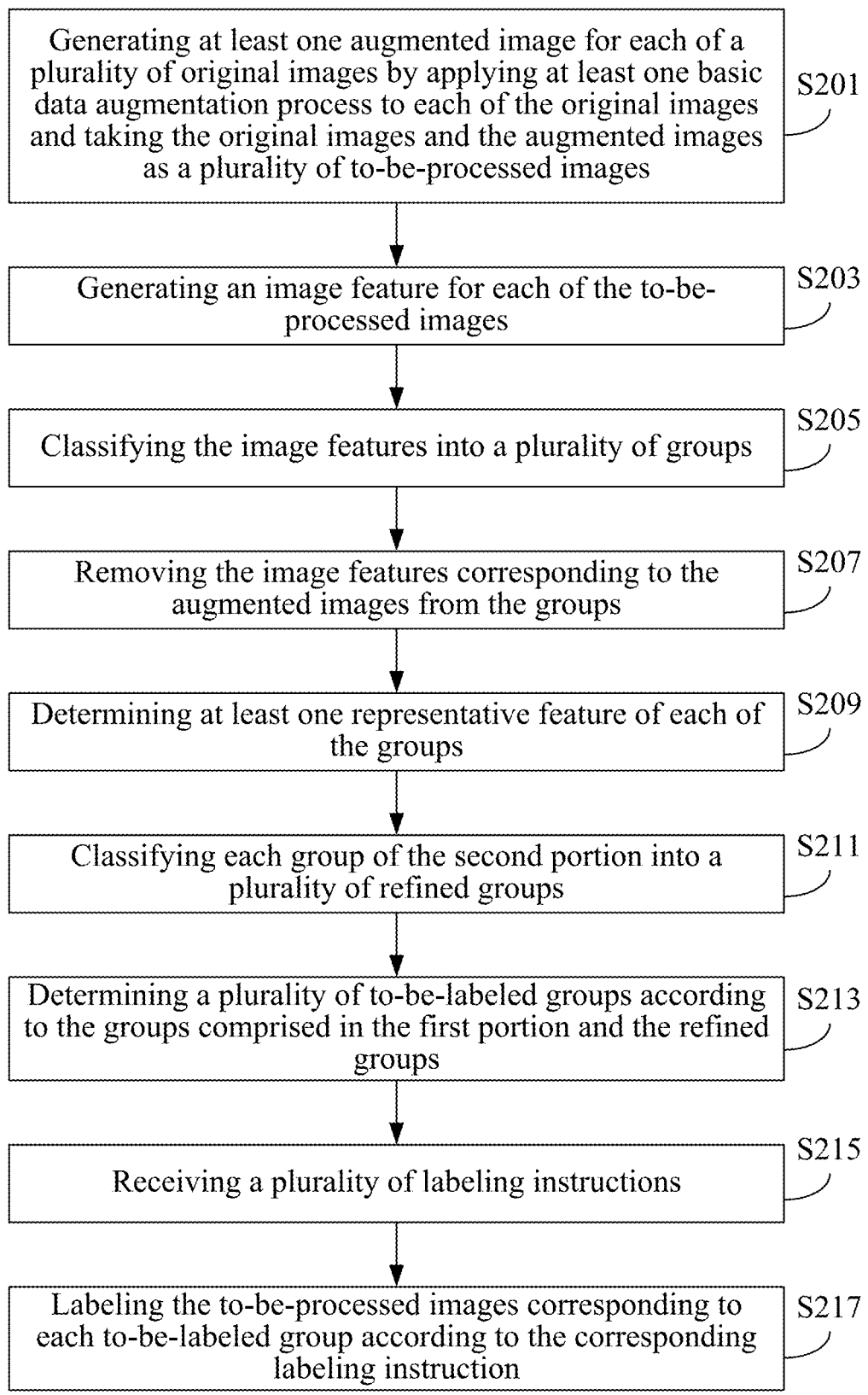
FIG. 2 depicts the main flowchart of an image labeling method.

A second embodiment of the present invention is an image labeling method, and the main flowchart of which is depicted in FIG. 2. The image labeling method is for use in an electronic computing apparatus, e.g., the aforementioned image labeling apparatus 1.

In this embodiment, the image labeling method first executes step S201. In the step S201, the electronic computing apparatus generates at least one augmented image for each of a plurality of original images by applying at least one basic data augmentation process to each of the original images, takes the original images and the augmented images as a plurality of to-be-processed images, and stores the to-be-processed images in the electronic computing apparatuses. In some embodiments, the image labeling method may take a plurality of original images as a plurality of to-be-processed images and, thus, the step S201 may be omitted.

In step S203, the electronic computing apparatus generates an image feature for each of the to-be-processed images. In some embodiments, the step 203 may input each of the to-be-processed images to an autoencoder to derive the image feature of each of the to-be-processed images from an encoder of the autoencoder. Moreover, in some embodiments, the image labeling method may first execute a step in which the electronic computing apparatus trains the autoencoder with the to-be-processed images and then execute the step S203 to input each of the to-be-processed images to the autoencoder to derive the image feature of each of the to-be-processed images from the encoder of the autoencoder.

In step S205, the electronic computing apparatus classifies the image features into a plurality of groups, e.g., by a clustering algorithm. In step S207, the electronic computing apparatus removes the image features corresponding to the augmented images from the groups. It shall be appreciated that, in other embodiments, the step S207 may be omitted if the step S201 has not been executed in the image labeling method.

In some embodiments, after the step S207, the image labeling method may further aggregate groups that are too small by the electronic computing apparatus. Specifically, the image labeling method may enable the electronic computing apparatus to execute a step to calculate a number of the at least one image feature comprised in each of the groups, enable the electronic computing apparatus to execute a step to determine a subset from the groups (the number of image features of each of the groups comprised in the subset is smaller than a threshold), and then enable the electronic computing apparatus to execute a step to integrate the groups of the subset by an agglomerative hierarchical clustering algorithm.

Figure 3:
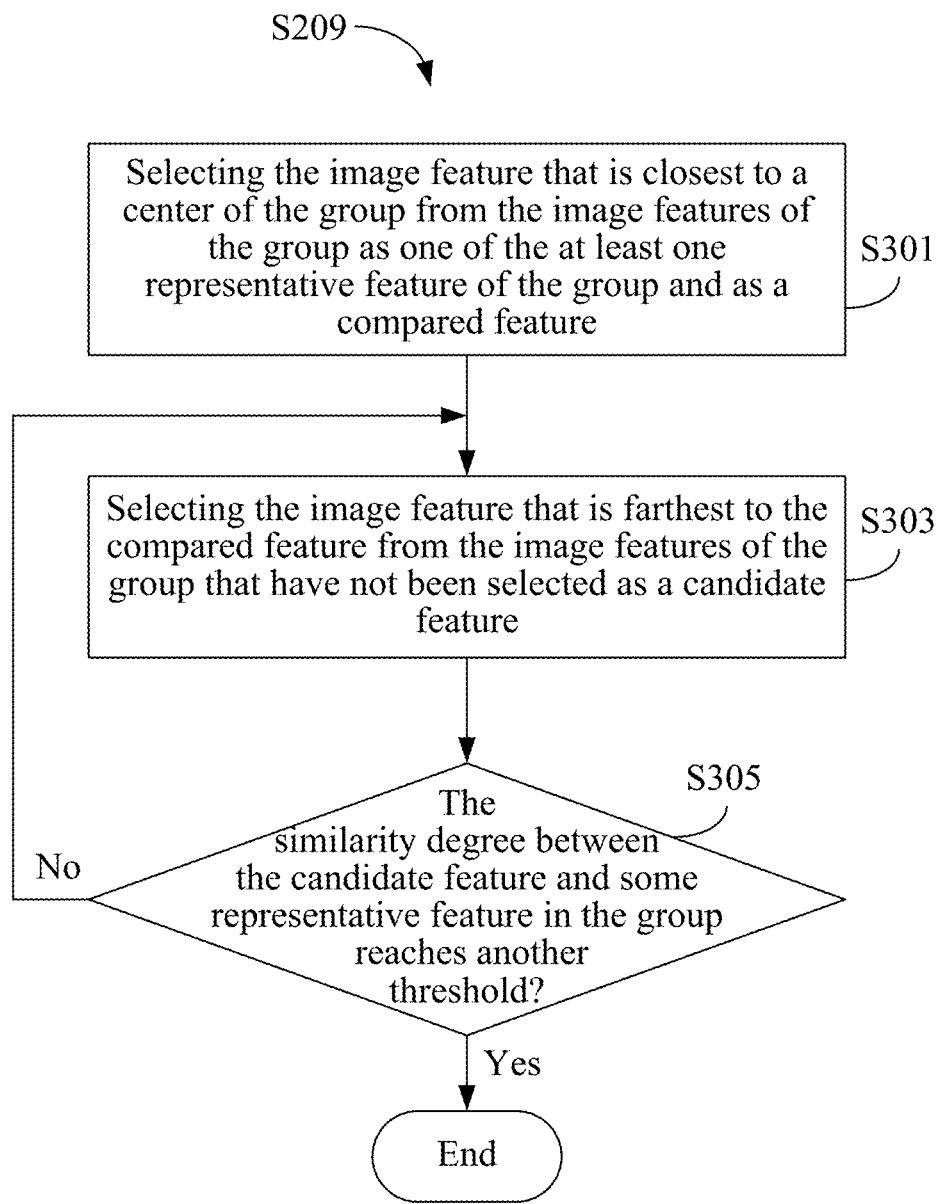
FIG. 3 depicts the flowchart of how to determine at least one representative feature of a group.

In step S209, the electronic computing apparatus determines at least one representative feature of each of the groups. Specifically, in the step S209, the electronic computing apparatus performs the procedure shown in FIG. 3 on each of the groups to determine at least one representative feature of each of the groups.

In step S301, the electronic computing apparatus selects the image feature that is closest to a center of the group from the image features of the group as one of the at least one representative feature of the group and as a compared feature. In step S303, the electronic computing apparatus selects the image feature that is farthest to the compared feature from the image features of the group that have not been selected as a candidate feature. It shall be appreciated that a similarity degree is between the candidate feature selected in the step S303 and each of the at least one representative feature of the group, and the image labeling method performs the determination in step S305 based on the similarity degree between the candidate feature and one or more representative features.

In step S305, the electronic computing apparatus determines whether the similarity degree between the candidate feature and some representative feature in the group reaches another threshold. If the determination result in the step S305 is "no" (i.e., the similarity degree between the candidate feature and all representative features in the group is smaller than the threshold), the image labeling method assigns the candidate feature as one of the at least one representative feature of the group and as the compared feature of the next iteration and then executes the step S303 again. If the determination result in the step S305 is "yes," the selection of representative features for the group is ended.

The step S209 of the image labeling method determines at least one representative feature for each of the groups as discussed above. These groups are classified into a first portion and a second portion by another threshold according to the number of representative features thereof. The the number of the representative feature of each group of the first portion is not greater than the threshold, while the number of the representative feature of each group of the second portion is greater than the threshold.

In step S211, the electronic computing apparatus classifies each group of the second portion into a plurality of refined groups, e.g., by a clustering algorithm. In step S213, the electronic computing apparatus determines a plurality of to-be-labeled groups according to the groups comprised in the first portion and the refined groups. In this embodiment, the step S213 assigns the groups comprised in the first portion and the refined groups obtained in the step S211 as a plurality of to-be-labeled groups. In some embodiments, the image labeling method may further perform the steps S301 to S305 on each of the refined groups obtained in the step S211 to determine at least one representative feature of each of the refined groups and then determine whether the number of representative features of each of the refined groups is greater than the aforesaid threshold. For the refined groups whose number of representative features is greater than the threshold (if any), the image labeling method may perform refined classification again by using the same steps. According to the foregoing descriptions, a person having ordinary skill in the art shall appreciate that the image labeling method may repeatedly perform the foregoing steps until finding out the groups that can properly classify all the image features (i.e., the number of representative features of all groups is not greater than the threshold). Thus, the details will not be further described herein. For those embodiments, the image labeling method takes the finally obtained groups (that is, the groups that can properly classify all image features) as a plurality of to-be-labeled groups.

In step S215, the electronic computing apparatus receives a plurality of labeling instructions, wherein each of the labeling instructions corresponds to one of the to-be-labeled groups. In step S217, the electronic computing apparatus labels the to-be-processed images corresponding to each to-be-labeled group according to the corresponding labeling instruction. In some embodiments, before executing the step S215, the image labeling method may execute a step to enable the electronic computing apparatus to provide at least one representative image of each of the to-be-labeled groups so that the user can determine one or more labels corresponding to each of the to-be-labeled groups according to the representative image corresponding to each of the to-be-labeled groups and then input the to-be-labeled instructions through an input interface. In some embodiments, the image labeling method may further perform a step to enable the electronic computing apparatus to input each of the at least one representative feature of each to-be-labeled group into a decoder comprised in the autoencoder to obtain a corresponding representative image.

In addition to the aforesaid steps, the second embodiment can execute all the operations and steps executed by the image labeling apparatus 1, have the same functions, and deliver the same technical effects as the image labeling apparatus 1. How the second embodiment executes these operations and steps, has the same functions, and delivers the same technical effects as the image labeling apparatus 1 will be readily appreciated by a person having ordinary skill in the art based on the above explanation of the image labeling apparatus 1 and, thus, the details will not be further described herein.

The image labeling method described in the second embodiment may be implemented as a computer program comprising a plurality of codes. The computer program is stored in a non-transitory computer readable storage medium. After the codes of the computer program are loaded into an electronic computing apparatus (e.g., the image labeling apparatus 1), the computer program executes the image labeling method as described in the second embodiment. The non-transitory computer readable storage medium may be an electronic product, such as a Read Only Memory (ROM), a flash memory, a floppy disk, a hard disk, a Compact Disk (CD), a Digital Versatile Disc (DVD), a mobile disk, a database accessible to networks, or any other storage media with the same function and well-known to a person having ordinary skill in the art.

It shall be appreciated that, in the specification and the claims of the present invention, some terms (including compared features, candidate features, similarity degree, portion, number, threshold) are preceded by the terms "first," "second," or "third." Please note that the terms "first," "second," and "third" are used only for distinguishing different terms.

According to the above descriptions, the present invention provide an image labeling technology (including at least the apparatus, method, and non-transitory computer readable storage medium) that uses the clustering technology to achieve semi-automatic labeling of a plurality of to-be-processed images. The image labeling technology provided by the present invention generates an image feature for each of the to-be-processed images, classifies the image features into a plurality of groups, and determines at least one representative feature of each of the groups. If the number of representative features in a group is greater than a threshold, it means that the group is not properly classified and the group is mixed with image features belonging to different categories or/and having different characteristics. Therefore, if the number of representative features in a group is greater than the threshold, the image labeling technology provided by the present invention will perform further classification on the group and may further determine at least one representative feature for each group obtained after the further classification. The image labeling technology provided by the present invention may repeatedly perform the above operations until the to-be-processed images have been properly classified.

The image labeling technology provided by the present invention will consider the groups obtained after the above processing as to-be-labeled groups. Since the to-be-labeled groups have been properly classified, all the to-be-processed images in the same to-be-labeled group can be given the same label. For example, for a to-be-labeled group, the user may decide how to label all the to-be-processed images of the to-be-labeled group according to one or several to-be-processed images of the to-be-labeled group (e.g., the to-be-processed image(s) corresponding to the representative feature(s)) and input a corresponding labeling instruction. The image labeling technology provided by the present invention then labels the to-be-processed images corresponding to the to-be-labeled group according to the corresponding labeling instruction. With the above operations/steps, the image labeling technology provided by the present invention can achieve semi-automatic labeling of a plurality of to-be-processed images and thereby greatly reduce the cost of labelling data by users.

The above disclosure is related to the detailed technical contents and inventive features thereof. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An image labeling apparatus, comprising:
   a transceiving interface;
   a storage, being configured to store a plurality of to-be-processed images; and
   a processor, being electrically connected to the transceiving interface and the storage and configured to generate an image feature for each of the to-be-processed images, classify the image features into a plurality of groups, and perform the following operations on each of the groups to generate at least one representative feature of each of the groups:
   (a) selecting the image feature that is closest to a center of the group from the image features of the group as one of the at least one representative feature of the group and as a first compared feature,
   (b) selecting the image feature that is farthest to the first compared feature from the image features of the group that have not been selected as a first candidate feature, wherein a first similarity degree is between the first candidate feature and each representative feature of the group, and
   (c) comparing at least one of the at least one first similarity degree with a first threshold,
   wherein when the at least one first similarity degree is all smaller than the first threshold, the processor assigns the first candidate feature as one of the at least one representative feature of the group and as the first compared feature of the next iteration and performs the operation (b) and the operation (c) again,
   wherein the groups are classified into a first portion and a second portion by a second threshold, a first number of the at least one representative feature of each group of the second portion is greater than the second threshold, the processor classifies each group of the second portion into a plurality of refined groups and assigns the groups of the first portion and the refined groups of the second portion as a plurality of to-be-labeled groups,
   wherein the transceiving interface receives a plurality of labeling instructions, each labeling instruction corresponds to one of the to-be-labeled groups, and the processor labels the to-be-processed images of each to-be-labeled group according to the corresponding labeling instruction.

2. The image labeling apparatus of claim 1, wherein the processor further generates at least one augmented image for each of a plurality of original images by applying at least one basic data augmentation process to each of the original images, and the processor further takes the original images and the augmented images as the to-be-processed images.

3. The image labeling apparatus of claim 2, wherein the processor further removes the image features corresponding to the augmented images from the groups.

4. The image labeling apparatus of claim 1, wherein the processor further calculates a second number of the at least one image feature of each of the groups, the processor further determines a subset of the groups, the second number of each group of the subset is smaller than a third threshold, the processor further integrates the groups of the subset by an agglomerative hierarchical clustering algorithm.

5. The image labeling apparatus of claim 1, wherein the processor further performs the following operations on each of the refined groups to generate at least one representative feature of each of the refined groups:
   (d) selecting the image feature that is closest to a center of the refined group from the image features of the refined group as one of the at least one representative feature of the refined group and as a second compared feature,
   (e) selecting the image feature that is farthest to the second compared feature from the image features of the refined group that have not been selected as a second candidate feature, wherein a second similarity degree is between the second candidate feature and each representative feature of the refined group, and
   (f) comparing at least one of the at least one second similarity degree with the first threshold,
   wherein when the at least one second similarity degree is all smaller than the first threshold, the processor assigns the second candidate feature as one of the at least one representative feature of the refined group and as the second compared feature of the next iteration and performs the operation (e) and the operation (f) again.

6. The image labeling apparatus of claim 5, wherein the processor further inputs each of the to-be-processed images to an autoencoder to derive the image feature of each of the to-be-processed images from an encoder of the autoencoder.

7. The image labeling apparatus of claim 6, wherein the processor further inputs each representative feature of each to-be-labeled group to a decoder of the autoencoder to derive a representative image of each representative feature.

8. An image labeling method for use in an electronic computing apparatus, the electronic computing apparatus storing a plurality of to-be-processed images, the image labeling method comprising:
   (a) generating an image feature for each of the to-be-processed images;
   (b) classifying the image features into a plurality of groups;
   (c) performing the following operations on each of the groups to generate at least one representative feature of each of the groups:
   (c1) selecting the image feature that is closest to a center of the group from the image features of the group as one of the at least one representative feature of the group and as a first compared feature;
   (c2) selecting the image feature that is farthest to the first compared feature from the image features of the group that have not been selected as a first candidate feature, wherein a first similarity degree is between the first candidate feature and each representative feature of the group; and
   (c3) comparing at least one of the at least one first similarity degree with a first threshold,
   wherein when the at least one first similarity degree is all smaller than the first threshold, assigning the first candidate feature as one of the at least one representative feature of the group and as the first compared feature of the next iteration and performing the step (c2) and the step (c3) again, wherein the groups are classified into a first portion and a second portion by a second threshold, a first number of the at least one representative feature of each group of the second portion is greater than the second threshold, and the image labeling method further comprises the following steps of:

(d) classifying each group of the second portion into a plurality of refined groups;

(e) assigning the groups of the first portion and the refined groups of the second portion as a plurality of to-be-labeled groups;

(f) receiving a plurality of labeling instructions, wherein each labeling instruction corresponds to one of the to-be-labeled groups; and (g) labeling the to-be-processed images of each to-be-labeled group according to the corresponding labeling instruction.

9. The image labeling method of claim 8, further comprising:

generating at least one augmented image for each of a plurality of original images by applying at least one basic data augmentation process to each of the original images, wherein the to-be-processed images comprise the original images and the augmented images.

10. The image labeling method of claim 9, further comprising:

removing the image features corresponding to the augmented images from the groups.

11. The image labeling method of claim 8, further comprising:

calculating a second number of the at least one image feature of each of the groups;

determining a subset of the groups, wherein the second number of each group of the subset is smaller than a third threshold; and integrating the groups of the subset by an agglomerative hierarchical clustering algorithm.

12. The image labeling method of claim 8, further comprising:

(h) performing the following operations on each of the refined groups to generate at least one representative feature of each of the refined groups:

(h1) selecting the image feature that is closest to a center of the refined group from the image features of the refined group as one of the at least one representative feature of the refined group and as a second compared feature;

(h2) selecting the image feature that is farthest to the second compared feature from the image features of the refined group that have not been selected as a second candidate feature, wherein a second similarity degree is between the second candidate feature and each representative feature of the refined group; and (h3) comparing at least one of the at least one second similarity degree with the first threshold, wherein when the at least one second similarity degree is all smaller than the first threshold, assigning the second candidate feature as one of the at least one representative feature of the refined group and as the second compared feature of the next iteration and performing the step (h2) and the step (h3) again.

13. The image labeling method of claim 12, wherein the step (a) inputs each of the to-be-processed images to an autoencoder to derive the image feature of each of the to-be-processed images from an encoder of the autoencoder.

14. The image labeling method of claim 13, further comprising:

inputting each representative feature of each to-be-labeled group to a decoder of the autoencoder to derive a representative image of each representative feature.

15. A non-transitory computer readable storage medium, storing a computer program comprising a plurality of codes, the computer program executing an image labeling method after the codes are loaded into an electronic computing apparatus, the electronic computing apparatus storing a plurality of to-be-processed images, and the image labeling method comprising:

(a) generating an image feature for each of the to-be-processed images;

(b) classifying the image features into a plurality of groups;

(c) performing the following operations on each of the groups to generate at least one representative feature of each of the groups:

(c1) selecting the image feature that is closest to a center of the group from the image features of the group as one of the at least one representative feature of the group and as a first compared feature;

(c2) selecting the image feature that is farthest to the first compared feature from the image features of the group that have not been selected as a first candidate feature, wherein a first similarity degree is between the first candidate feature and each representative feature of the group; and (c3) comparing at least one of the at least one first similarity degree with a first threshold, wherein when the at least one first similarity degree is all smaller than the first threshold, assigning the first candidate feature as one of the at least one representative feature of the group and as the first compared feature of the next iteration and performing the step (c2) and the step (c3) again, wherein the groups are classified into a first portion and a second portion by a second threshold, a first number of the at least one representative feature of each group of the second portion is greater than the second threshold, and the image labeling method further comprises the following steps of:

(d) classifying each group of the second portion into a plurality of refined groups;

(e) assigning the groups of the first portion and the refined groups of the second portion as a plurality of to-be-labeled groups;

(f) receiving a plurality of labeling instructions, wherein each labeling instruction corresponds to one of the to-be-labeled groups; and (g) labeling the to-be-processed images of each to-be-labeled group according to the corresponding labeling instruction.

16. The non-transitory computer readable storage medium of claim 15, wherein the image labeling method further comprises:

generating at least one augmented image for each of a plurality of original images by applying at least one basic data augmentation process to each of the original images, wherein the to-be-processed images comprise the original images and the augmented images.

17. The non-transitory computer readable storage medium of claim 16, wherein the image labeling method further comprises:

removing the image features corresponding to the augmented images from the groups.

18. The non-transitory computer readable storage medium of claim 15, wherein the image labeling method further comprises:
- calculating a second number of the at least one image feature of each of the groups;
- determining a subset of the groups, wherein the second number of each group of the subset is smaller than a third threshold; and
- integrating the groups of the subset by an agglomerative hierarchical clustering algorithm.

19. The non-transitory computer readable storage medium of claim 15, wherein the image labeling method further comprises:
- (h) performing the following operations on each of the refined groups to generate at least one representative feature of each of the refined groups:
  - (h1) selecting the image feature that is closest to a center of the refined group from the image features of the refined group as one of the at least one representative feature of the refined group and as a second compared feature;
  - (h2) selecting the image feature that is farthest to the second compared feature from the image features of the refined group that have not been selected as a second candidate feature, wherein a second similarity degree is between the second candidate feature and each representative feature of the refined group; and
  - (h3) comparing at least one of the at least one second similarity degree with the first threshold,
  - wherein when the at least one second similarity degree is all smaller than the first threshold, assigning the second candidate feature as one of the at least one representative feature of the refined group and as the second compared feature of the next iteration and performing the step (h2) and the step (h3) again.

20. The non-transitory computer readable storage medium of claim 19, wherein the step (a) inputs each of the to-be-processed images to an autoencoder to derive the image feature of each of the to-be-processed images from an encoder of the autoencoder, and the image labeling method further comprises:
- inputting each representative feature of each to-be-labeled group to a decoder of the autoencoder to derive a representative image of each representative feature.

* * * * *